(12) United States Patent
Ziedan et al.

(10) Patent No.: US 7,545,894 B2
(45) Date of Patent: Jun. 9, 2009

(54) METHOD AND APPARATUS FOR DETECTING AND PROCESSING GLOBAL POSITIONING SYSTEM (GPS) SIGNALS

(75) Inventors: Nesreen I. Ziedan, Oxford, OH (US); James L. Garrison, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 655 days.

(21) Appl. No.: 11/087,065

(22) Filed: Mar. 21, 2005

(65) Prior Publication Data

US 2005/0232338 A1 Oct. 20, 2005

Related U.S. Application Data

(60) Provisional application No. 60/554,660, filed on Mar. 19, 2004.

(51) Int. Cl.
*H04B 7/10* (2006.01)

(52) U.S. Cl. ............ 375/347; 340/426.19; 340/539.13; 342/357.05; 342/357.06; 342/357.12; 701/213

(58) Field of Classification Search ................ 375/347; 340/426.19, 539.13; 342/357.05, 357.06, 342/357.12; 702/213; 701/213
See application file for complete search history.

(56) References Cited

U.S. PATENT DOCUMENTS

2003/0201934 A1* 10/2003 Asher et al. ............ 342/357.12

2006/0055596 A1* 3/2006 Bryant et al. .......... 342/357.06

OTHER PUBLICATIONS

Ziedan, "Unaided Acquisition of Weak GPS Signals Using Circular Correlation or Double-Block Zero Padding," in Proc. IEEE-Plans 2004, Apr. 26-29, 2004.*
Little, "GPS disciplined rubidium oscillator" European Frequency and Time Forum, 1996. EFTF 96., Tenth (IEE Conf. Publ. 418) Mar. 5-7, 1996 pp. 105-110.*
Schneider, "A Kalman filter for an integrated Doppler/GPS navigation system", Position Location and Navigation Symposium, 1988, "Navigation into the 21st Century", IEEE Plans '88, IEEE Nov. 29-Dec. 2, 1988 pp. 408-415.*

* cited by examiner

*Primary Examiner*—Juan A Torres
(74) *Attorney, Agent, or Firm*—Maginot, Moore & Beck

(57) ABSTRACT

A method acquires a location system signal that includes second data signals superimposed on the first data signals. The method includes iterating Doppler frequency offset values and time offsets to generate error signals, each representing a difference between summed consecutive correlation values and a corresponding estimated ideal value. Each error signal corresponds to a different time offset and an associated time period. The second data signal has a bit edge that occurs during the time period of each of the sums of consecutive correlation values. The presence of a bit edge during an associated time period increases the error signal. A measure of the minimum error is used to identify a time offset value that is used to develop a first determined Doppler frequency offset. A Kalman filter refines the first determined Doppler frequency offset.

10 Claims, 7 Drawing Sheets

METHOD AND APPARATUS FOR DETECTING AND PROCESSING GLOBAL POSITIONING SYSTEM (GPS) SIGNALS

This application claims the benefit of U.S. Provisional Patent Application Ser. No. 60/554,660, filed Mar. 19, 2004 which is incorporated herein by reference.

FIELD OF THE INVENTION

The present invention relates generally to GPS signals and/or other multiple source radio location systems.

BACKGROUND

The Global Positioning System (GPS) is a satellite-based location system. In the GPS, several satellites orbiting the earth provide signal codes that are detected by receivers. Other positioning systems, such as the Galileo system, operate in a similar manner. The receivers in such systems use the codes to lock onto the satellite signal. The receiver or user then measures the time of arrival of the satellite signal against an internal clock, which indicates a delay from the satellite. Such delay is determined for at least four different satellites. Those delays translate to distances. Because the distances to each of four satellites are known, and because the position of the satellites may be obtained from the signals transmitted by the satellites, the X, Y, and Z coordinates of the receiver/user may be calculated, as well as the receiver's clock error. This method is known as pseudoranging, and systems other than GPS use similar technology.

Weak signals present problems that make acquisition and tracking of GPS signals difficult. In particular, failure to accurately acquire and track weak GPS signals makes it difficult to obtain accurate delay measurements, since even a small error can translate to large inaccuracies in location.

One of the ways in which the delay between transmission of a satellite and reception by a receiver is obtained is by causing the receiver to identify and synchronize to a repetitive code of a particular satellite. To this end, the receiver generates a replica of the code of each satellite in repetitive pattern and then, for a particular satellite, tries to line up the internally generated code with the received code from the satellite. To "line up" the internally generated code, the internally generated code sequence must usually be delayed by some amount. The delay between the transmitted signal and a received signal causes delay in the received code signal having the relationship set forth below.

$$Code_{satl}(t) = Code_{rec}(t+\Delta_l), \quad (1)$$

where $\delta_l$ is a delay value, $Code_{satl}$ is the code signal transmitted by the satellite, and $Code_{rec}$ is the receive code signal. By aligning internal codes of other satellites with corresponding internal codes, other delay values may be obtained. Thus, for three other satellites, delay values $\Delta_2$, $\Delta_3$, and $\Delta_4$ may be generated. Then, by obtaining the position information for those satellites $(x_j, y_j, z_j)$ for $j=\{1, 2, 3, 4\}$, the equations that may be used to solve for the position of the receiver may be set up.

First, the distance between a satellite and the receiver in terms of delay may be expressed as $$Distance = \Delta_j * C(\text{speed of light}). \quad (2)$$

However, the measured delay does not provide an absolute delay value because the clock in the receiver is not necessarily synchronized to the satellites, which are synchronized together. So the actual distance between a satellite n and the receiver is the measured delay $\Delta j$, plus a receiver clock offset $T_{off}$, times the speed of light. Thus, the following equations can be set up $$(\Delta_1 + T_{off}) * C = [(x_1-x_r)^2 + (y_1-y_r)^2 + (z_1-z_r)^2]^{1/2} \quad (3)$$

$$(\Delta_2 + T_{off}) * C = [(x_2-x_r)^2 + (y_2-y_r)^2 + (z_2-z_r)^2]^{1/2} \quad (4)$$

$$(\Delta_3 + T_{off}) * C = [(x_3-x_r)^2 + (y_3-y_r)^2 + (z_3-z_r)^2]^{1/2} \quad (5)$$

$$(\Delta_4 + T_{off}) * C = [(x_4-x_r)^2 + (y_4-y_r)^2 + (z_4-z_r)^2]^{1/2} \quad (6)$$

The above four equations amount to four equations with four unknowns, which may then be solved for the receiver position $x_r$, $y_r$, $z_r$, as well as the offset of the receiver clock $T_{off}$. It may readily be observed that because the speed of light is 286,000 miles per second, that even a small discrepancy in a delay measurement $\Delta_j$ can result in significant inaccuracy.

In the presence of weak signals, it can be difficult to get an accurate alignment of the internal code replica and received signal to get a precise delay number. However, the acquisition code sequence, known in the art as the C/A code, is 1023 bits and repeated periodically every 1 millisecond. Thus, by superimposing the internal code replica over the received code for multiple instances of the code, a correlation technique may be used to filter out noise present in the signal. As the number of 1 millisecond periods used for correlation increases, the ability of the receiver to acquire weaker signals increases.

The practical number of C/A sequences that may be used is hindered, however, by the fact that the C/A code is in fact superimposed over another signal, referred to as the data signal, which has a pulse width of 20 milliseconds. The data signal contains the location information for the satellite, among other things. However, before the GPS signal is acquired, the data signal in the GPS signal is unknown to the receiver, and appears as a pseudorandom signal that changes pseudo randomly between −1 and +1. Because the receiver does not know the data signal, the receiver does not know the effects of the data signal on the C/A sequences. Transitions in the data signal between +1 and −1 completely change the appearance of the C/A sequences. Moreover, although there are 20 repetitions of the C/A sequence for every data signal value, the receiver does not have a priori knowledge of when the transitions of the data signal occur.

Accordingly, the presence of the data signal makes it difficult to use multiple C/A sequences to achieve acquisition of the C/A code for weak GPS signals. In the prior art, methods have been used to overcome this difficulty. According to one method, two sets of ten adjacent C/A code sequences are correlated to the internal signal. One of the two sets is guaranteed not to have a data bit transition in it. Thus, the set of C/A code sequences with the higher correlation value, which is indicative of the lack of a bit transition, is used to acquire the C/A codes sequences and arrive at the delay value.

One shortfall of the above described method of using two sets of C/A code is that there is a practical limit on how a weak signal may be obtained using 10 C/A code sequences for correlation.

In addition, code acquisition using multiple C/A code sequences can be thwarted by Doppler shift in the frequency, which changes slightly the duration of the codes within the sequences. In particular, while the GSP signal is transmitted with a known carrier frequency (e.g. 1575 MHz), relative movement between the satellite and the receiver, as well as other things, can introduce a Doppler frequency shift between the signal as transmitted, and the signal received. The Doppler frequency shift adds to the difficulty of tracking the C/A code of the GPS signal.

SUMMARY OF THE INVENTION

The present overcomes the shortcomings of the prior art by providing a recursive code acquisition process and apparatus that uses filtering to refine initial Doppler shift estimates and use those refined estimates to obtain an accurate alignment of internally generated sequences with a predefined sequence of a weak location signal.

One embodiment of the invention is a method of acquiring a location system signal, the location system signal including a first data signal and a second data signal superimposed on the first data signal. The method includes generating an initial Doppler frequency offset value, the initial Doppler frequency offset representing a variance from a nominal frequency for the location system signal and a frequency of a received location system signal. The method also includes using the initial Doppler frequency offset value to generate a plurality of error signals, each error signal representing a difference between a sum of consecutive correlation values and a corresponding estimated ideal value. Each error signal corresponds to a different time offset and an associated time period in which the consecutive correlation values pertain. The second data signal has a bit edge that occurs during the tithe period of each of at least some of the sums of consecutive correlation values. A bit transition at the bit edge causes an increase in the error signal if the bit edge occurs during a time period associated with the error signal. The method also includes using a Kalman filter to generate a new initial Doppler frequency offset value, and generating new error signals.

According to one embodiment of the invention, the Kalman filter and Viterbi algorithm are combined to determine the data bit edge of a previously unknown second data signal (e.g. a navigation data signal) that is superimposed on a repeating first data signal (e.g. the C/A code sequence). By determining the data bit edge, the beginning and end of an unchanging value of the second data signal can be ascertained, which allows for extended integration of correlation values of the repeating first data signal. For example, in a GPS system, 20 C/A sequences occur over the course of each data bit. Once the embodiment of the present invention ascertains the locations of the data bit edges, the correlation of the signal may use all twenty C/A sequences between the data bit edges, thereby allowing acquisition of weak signals.

The above described features and advantages, as well as others, will become more readily apparent to those of ordinary skill in the art by reference to the following detailed description and accompanying drawings.

DETAILED DESCRIPTION

Figure 1:
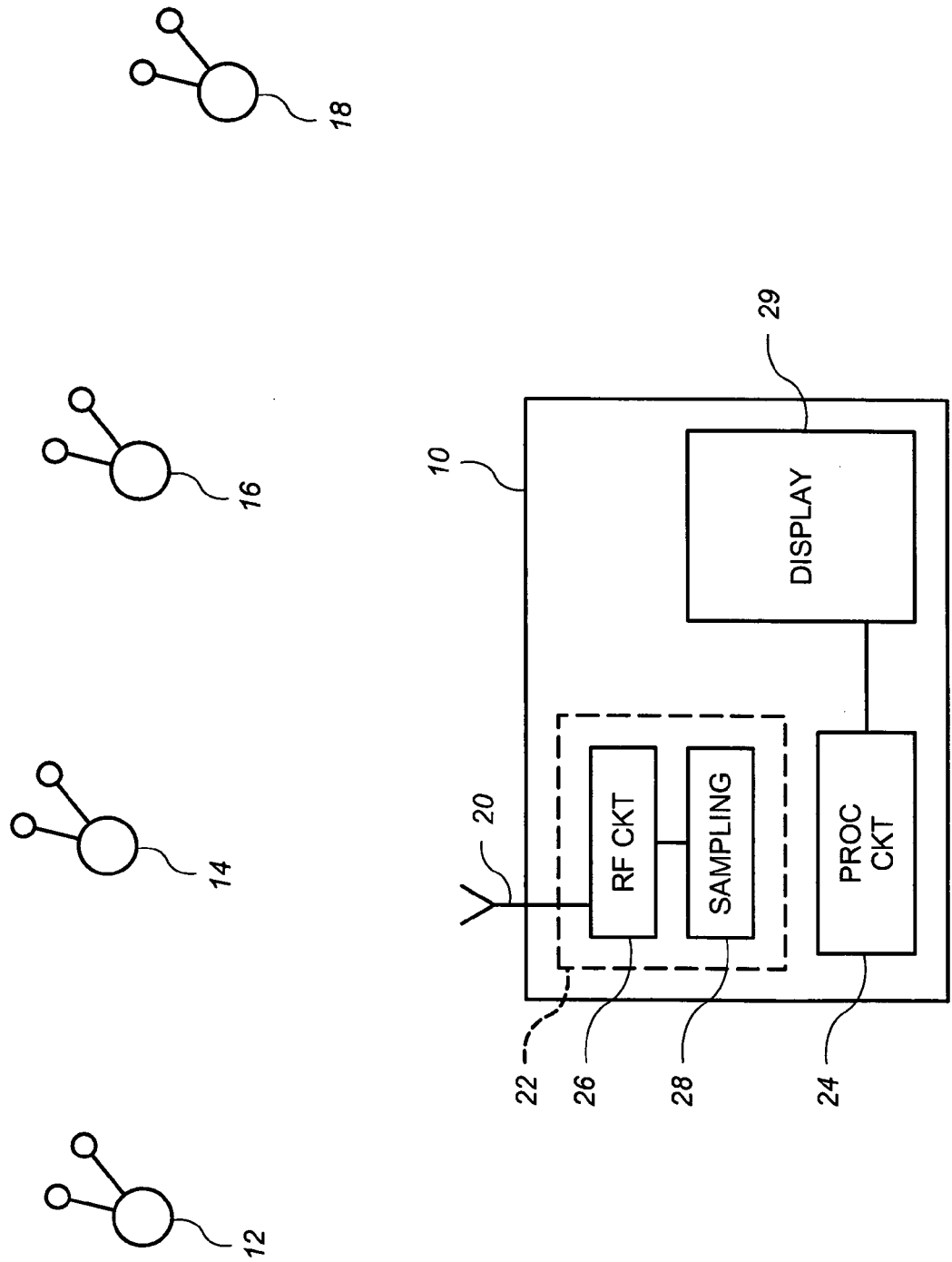
FIG. 1 shows a block diagram of a GPS receiver and four GPS satellites according to exemplary embodiments of the invention.

FIG. 1 shows a block diagram of an apparatus 10 for receiving and processing GPS signals, in an environment in which the apparatus 10 receives RF GPS signals from four satellites 12, 14, 16 and 18. The receiver 10 includes an antenna 20, an input circuit 22, a processing circuit 24, and preferably a display 29 operable to display location information generated by the processing circuit 24 as will be discussed below in further detail.

The input circuit 22 is operably connected to receive RF GPS signals detected by the antenna 20, and to convert the signals into digital IF signals. As is known in the art, GPS signals are transmitted on the known L1 carrier frequency 1575.42 MHz. In the embodiment described herein, the input circuit 22 includes an RF processing circuit 26 and a sampling unit 28. The RF processing unit 26 includes filtering, amplification and frequency conversion equipment known in the art, and is capable of generating an analog IF signal from the 1575.42 signal. The sampling unit 28 is a device operable to sample, and preferably downsample, the analog IF signal in order to generate the digital code signal.

As is known in the art, the code signal consists of first and second transmitted codes (from one of the satellites 12, 14, 16 and 18) plus a noise element. The received signal may thus be represented as:

$$r_q = A d_q c_q + n_q. \quad (7)$$

where $r_q$ is a received value at a sample index q, A is the amplitude of the transmitted signal, $d_q$ is the transmitted navigational data value at a sample q, $c_q$ is the transmitted C/A code value at the sample q, and $n_q$ is the noise added at the sample q. The navigational data $d_q$ includes the position information provided by the satellite. Each data bit of the navigation data signal d(n) has a duty cycle of 20 milliseconds, and each bit has a value of either −1 and +1. The signal product Ad(n)c(m) constitutes the transmitted signal.

Figure 2:
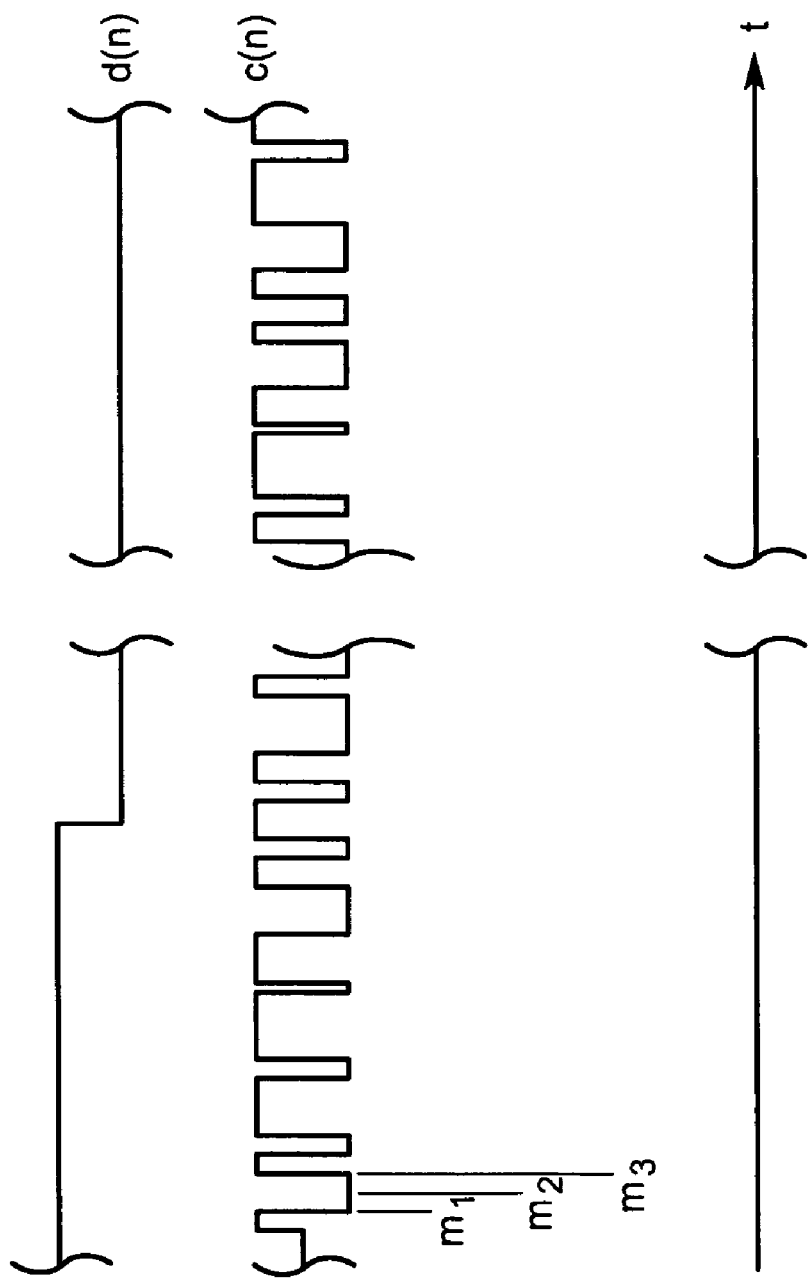
FIG. 2 shows a timing diagram of constituent elements of the GPS baseband signal.

FIG. 2 shows a timing diagram of the components of an exemplary transmitted signal including the data signal d(n) and the C/A code c(m). The bit rate of n is 50 bits/sec, while the sample rate of m is 1,023,000 bits/sec. As discussed above, there are 1023 code bits (i.e. m=0 to 1022) in the C/A code sequence for each satellite. The C/A code sequence is repeated twenty times for each data signal bit d(n). FIG. 2 furthermore shows a timing diagram of the elements c(m) and d(n) of an exemplary transmitted. It will be appreciated that d(n) as used herein represents the data signal value for a data signal bit indexed n, while $d_q$ represents the value of the data signal d(n) for each sample q that is taken. Similarly, $c_q$ represents the value of the data signal c(m) for each sample q that is taken. The sample rate q is preferably several times the rate of m.

In general, the processing circuit 24 is a digital processing circuit that is operable to acquire GPS signals using the sampled received signal $r_q$. By acquiring GPS signals, it is meant that the processing circuit 24 is able to identify a particular C/A code sequence unique to the satellite that transmitted the signal, and successfully predict the starting time of the C/A code sequence.

The processing circuit 24 is further operable to track the acquired code using known methods, which allows the processing circuit to obtain the navigational data signal d(n) over time and to further ascertain the alignment of the internal code replica with the received code.

The processing circuit 24 is also operable to generate a delay value representative of a delay between an internal code replica c'(m) and the code c(m) of the received signal $r_q$. This delay is the delay $\Delta_n$ which is used in equations 2, 3, 4 and 5 above.

To this end, in accordance with aspects of some embodiments of the invention, the processing circuit 24 is operable to perform a recursive algorithm, modeled after a Viterbi algorithm, to accomplish fine acquisition of the C/A code c(m) and hence recovery of the navigation data bits d(n).

To accomplish the fine acquisition of the C/A code c(m), it is advantageous to perform correlations of the internal C/A code replica with the received C/A code signal over several C/A code sequence periods. Since the data signal d(n) is superimposed on the C/A code c(m) and may transition every twenty C/A code sequence periods, the processing circuit 24 operates to optimize the code acquisition correlation by identifying the data signal bit edges of the data signal d(n). Once the bit edges are identified, the processing circuit may integrate the correlations of the internal C/A code to all of the twenty C/A code sequences between the bit edges of d(n). To identify the bit edges of the data signal d(n), the processing circuit 24 uses a Viterbi algorithm and Kalman filter.

The Viterbi algorithm and Kalman filter also help determine an accurate Doppler frequency shift caused by relative motion of the satellite 12 and the receiver 10. The Doppler frequency shift is identified because it shifts the frequency of C/A code bits as well as the data bits from their expected frequencies. The knowledge of the Doppler frequency shift allows for accurate alignment of the internal C/A code replica with the received C/A code signal.

The processing circuit 24 and the other circuits of the receiver 10 are capable of repeating the above steps to acquire $\Delta_j$ values for each of the satellites 12, 14, 16 and 18.

The processing circuit 24 is further operable to receive the navigation data $d_j(n)$ for each satellite j when the C/A code of the satellite is acquired and tracked, as is known in the art. The navigation data $d_j(n)$ provides the $x_j$, $y_j$, and $z_j$ position information for each satellite j. Once the position information and the delay information for four satellites 12, 14, 16 and 18 are known, the position of the receiver may be solved using Equations 3-6, listed above.

To accomplish the foregoing, the processing circuit 24 may suitably be one or more microprocessors, co-processors, digital signal processors, controllers, discrete or custom processing devices, or combinations thereof.

Figure 3:
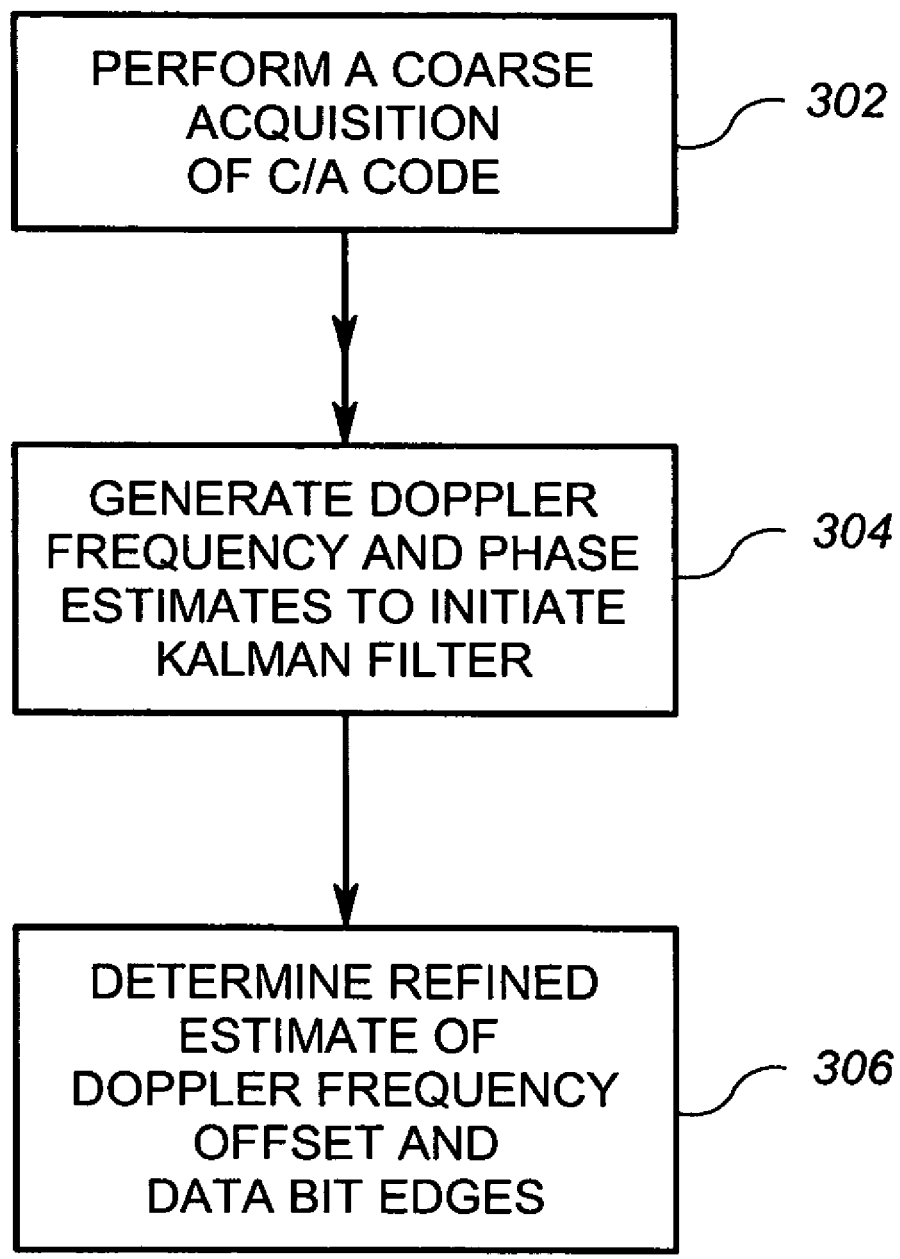
FIG. 3 shows a flow diagram of an exemplary set of operations of processing circuit of the GPS receiver of FIG. 1.

FIG. 3 shows an exemplary embodiment of a code acquisition operable according to the present invention. In general, the output of FIG. 3 is a value that identifies, among other things, the location of the bit edge of the data bits d(n), the Doppler frequency offset w, and the Doppler phase φ. These values help with precise alignment of the internal C/A code replica with the incoming signal. As discussed above, the location of the bit edge of the data signal d(n) allows for more samples to be correlated, which leads to acquisition of weaker signals.

The C/A code acquisition operation in step 302 begins with the processing circuit 24 performing a coarse acquisition. The coarse acquisition may suitably use standard correlation techniques to identify a rough or coarse C/A alignment. To this end, internally generated sample streams that approximate each of the satellites' C/A codes are generated and sequentially correlated to the incoming signal. Because each of the C/A codes has an over 1000 bit pattern, a correlation between an internal code and a received noisy code can be detected at relatively low signal to noise ratio.

Many methods may be used to perform the coarse acquisition. For example, as each digital sample $r_q$ is received, the last set of Q samples equivalent to a full C/A sequence can be multiplied with an internal replica code in the form of samples $c'_{j_q}$ for each satellite j's C/A code. If the jth satellite signal is not present, then the samples $c'_{j_q}$ will not correlate with any of the received signals and the sum of the multiplications will be indicative of noise. However, if the jth satellite signal is present, then some of the sums of multiplications will be larger than the nominal noise range, thus indicating correlation between the internal code samples $c'_{j_q}$ and the received samples $r_q$.

If correlation is detected for a particular internal code replica $c'_{j_q}$, then the coarse acquisition, may also add test Doppler frequency offsets to determine if the any of the offsets improve the correlation. The test Doppler frequency offset the provides the best correlation in the coarse algorithm is used as the coarse Doppler frequency offset $w_{coarse}$, which is used in later operations.

One example of a suitable coarse acquisition that may be used with the embodiment herein is described in N. I. Ziedan and J. L. Garrison, "Unaided Acquisition of Weak GPS Signals Using Circular Correlation or Double-Block Zero Padding," in Proc. IEEE-PLANS 2004, Apr. 26-29, 2004, Monterey, Calif., which is incorporated herein by reference.

In any event, once coarse acquisition has been accomplished for a particular code $c_j$, the processing circuit 24 executes step 304 to begin fine acquisition of the code $c_j$. It is fine acquisition that allows for tracking and decoding of the data signal for the satellite, $d_j(n)$. While the coarse acquisition operation discussed above takes advantage of the 1023 symbol C/A sequence to perform coarse acquisition on weaker signals, the identification of the bit edge of d(n) allows for the 1023 bits of twenty consecutive C/A sequences to be used for much finer acquisition of weak signals. Steps 304 and 306 cooperate to identify the bit edge of the data signal d(n) as well as an accurate estimate of the Doppler frequency offset.

In step 304, the processing circuit 24 generates initial Doppler frequency offset and phase values to initialize a Kalman filter operation of step 306. In particular, the processing circuit 24 begins a search algorithm to determine a reasonably accurate frequency offset from the nominal carrier frequency due to relative movement of satellite and receiver and/or ionosphere effects. While the coarse acquisition of step 302 generates a Doppler frequency offset estimate $w_{coarse}$ that is within 400 to 1000 Hz of the actual Doppler frequency offset, the Kalman filter of step 306 should be initialized with a much more accurate Doppler frequency offset, preferably within 1 or 2 Hz.

Thus, in step 304, this more accurate Doppler frequency estimate, $w_{est}$, is generated. To this end, various correlation attempts are made with a plurality of test Doppler frequency values $w_{est}$ until a relatively strong correlation indicates a relatively accurate Doppler frequency estimate $w_{est}$. In one embodiment, the various test Doppler frequencies $w_{test}$ are relatively far apart from each other, but centered around $w_{coarse}$. Once it is determined that one of the test frequencies produces the best correlation results, then new correlations are performed with set of test frequencies having smaller intervals and centered around that previously determined best frequency. The recursive search allows the initial value $w_{est}$ to be identified relatively efficiently. A more detailed example of the operations described above are provided below in connection with FIG. 4.

It will further be appreciated that the phase offset estimate φ of the Doppler frequency is used in the Kalman filter of step 306. Accordingly, an initial phase offset estimate $\phi_{est}$ should be generated in manner similar to that used for determining the Doppler frequency estimate $w_{est}$.

Once the Doppler frequency estimate $w_{est}$ and phase estimate $\phi_{est}$ have been generated, step 306 is performed. In step 306, the processing circuit 24 then performs another recursive algorithm using a Kalman filter to determine the best estimation for the Doppler frequency shift and the position of the bit edges of the data signal d(n). Once the data bit edge and the Doppler frequency are determined, the internal code replica may readily be aligned to the C/A code in the received signal $r_q$. When the internal code replica is aligned, the delay value Δ for the satellite may be determined. When the data bit edge of the data signal d(n) is identified, and the Doppler frequency shift is known, the navigation data may be obtained from the data signal.

Figure 7:
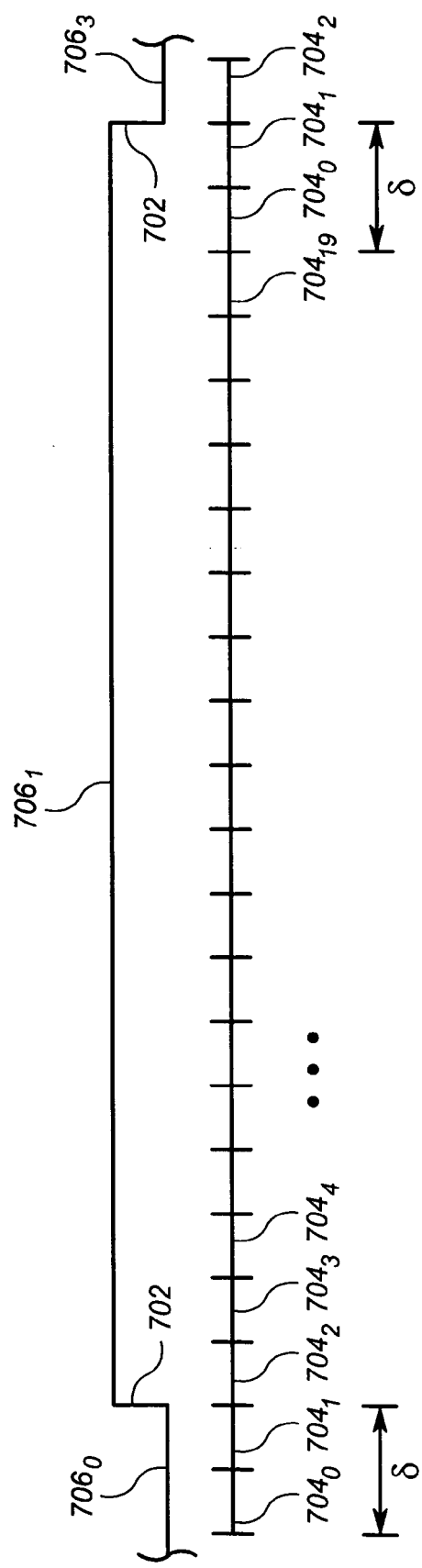
FIG. 7 shows an illustration of the possible locations of the bit edge of data bits, and a plurality of C/A sequences, where there are twenty C/A sequences corresponding to each data bit.

FIG. 7 shows an illustration of the possible locations of the bit edge 702 of data bits $706_y$, and a plurality of C/A sequences $704_x$, where there are twenty C/A sequences corresponding to each data bit 706. It is noted that unlike FIG. 2, the actual C/A sequence values c(m) are not illustrated in FIG. 7, and that each C/A sequence $704_x$ represents 1023 value c(m). In any event, when the data signal d(n) is unknown, as in the beginning of step 306 of FIG. 3, the particular C/A sequence $704_x$ on which the data bit edge 702 occurs is not known. The Viterbi algorithm of step 306 of FIG. 3 attempts to identify an offset δ from a reference C/A sequence $704_0$ at which the data bit edge 702 is located.

In accordance with the embodiment described herein, the Viterbi algorithm tests different "hypotheses" about the location of the data bit edge, using continuously refined estimates of the Doppler frequency and phase shift. Several parallel hypotheses are iterated several times until the algorithm converges on a select location of the data bit edge location and Doppler phase and frequency. The Kalman filter is used to improve the frequency and phase estimations after each iteration for each hypothesis.

Figure 5:
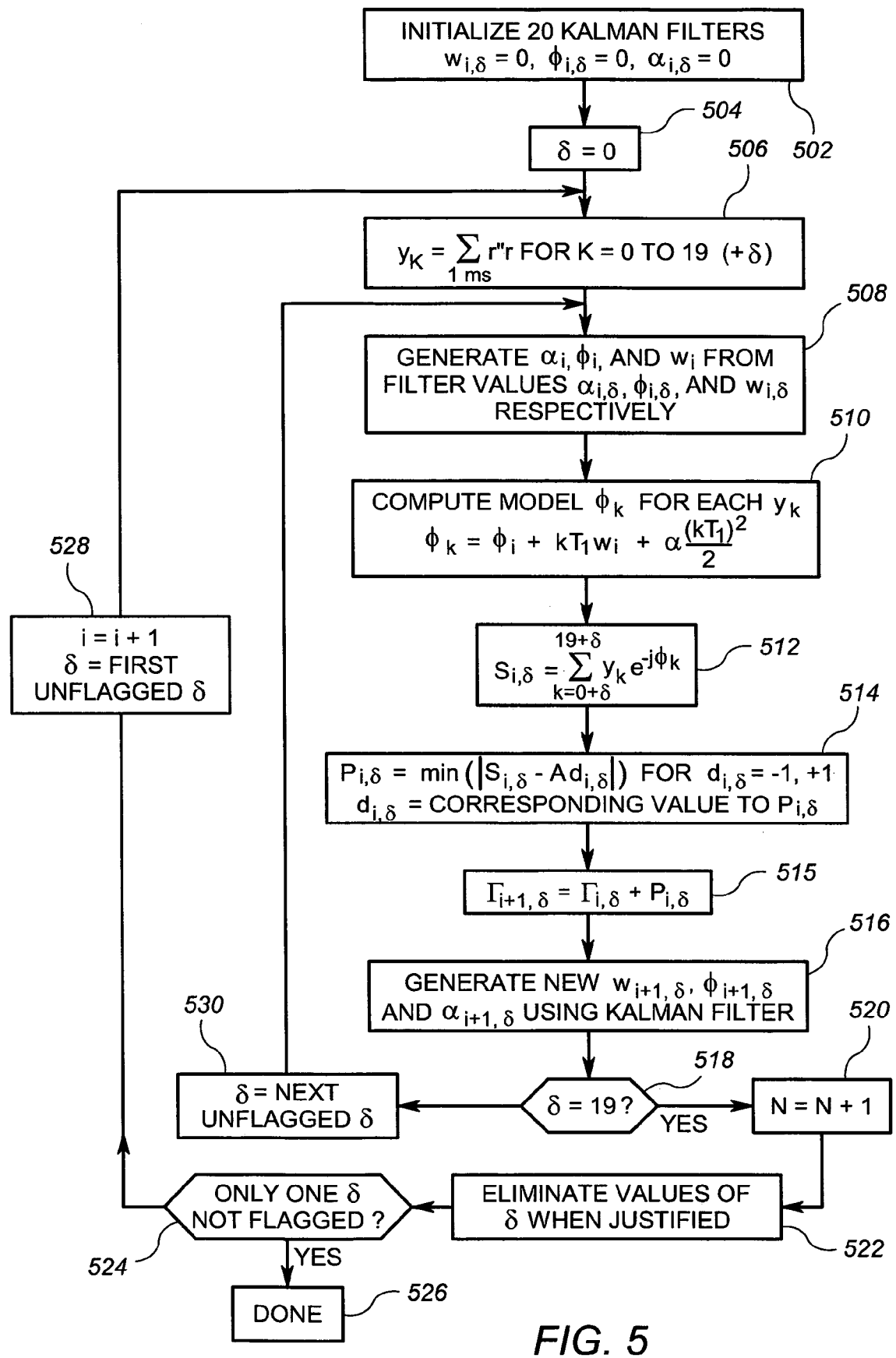
FIG. 5 shows in further detail an exemplary set of operations used to converge on a solution of Doppler frequency offset and bit edge.

FIG. 5, discussed further below, describes in further detail an exemplary set of operations that carry out the Viterbi algorithm discussed above to converge on a combination of a data bit edge location and a Doppler frequency and phase value.

Referring again to FIG. 3, after step 306, the C/A code of the satellite in question has been acquired. The processing circuit 24, as discussed above, will continue to track the C/A code using known techniques, and will further decode the navigational data signal d(n). These procedures are performed for at least four satellite signals, if possible, to allow the processing circuit 24 to solve for location.

Figure 4:
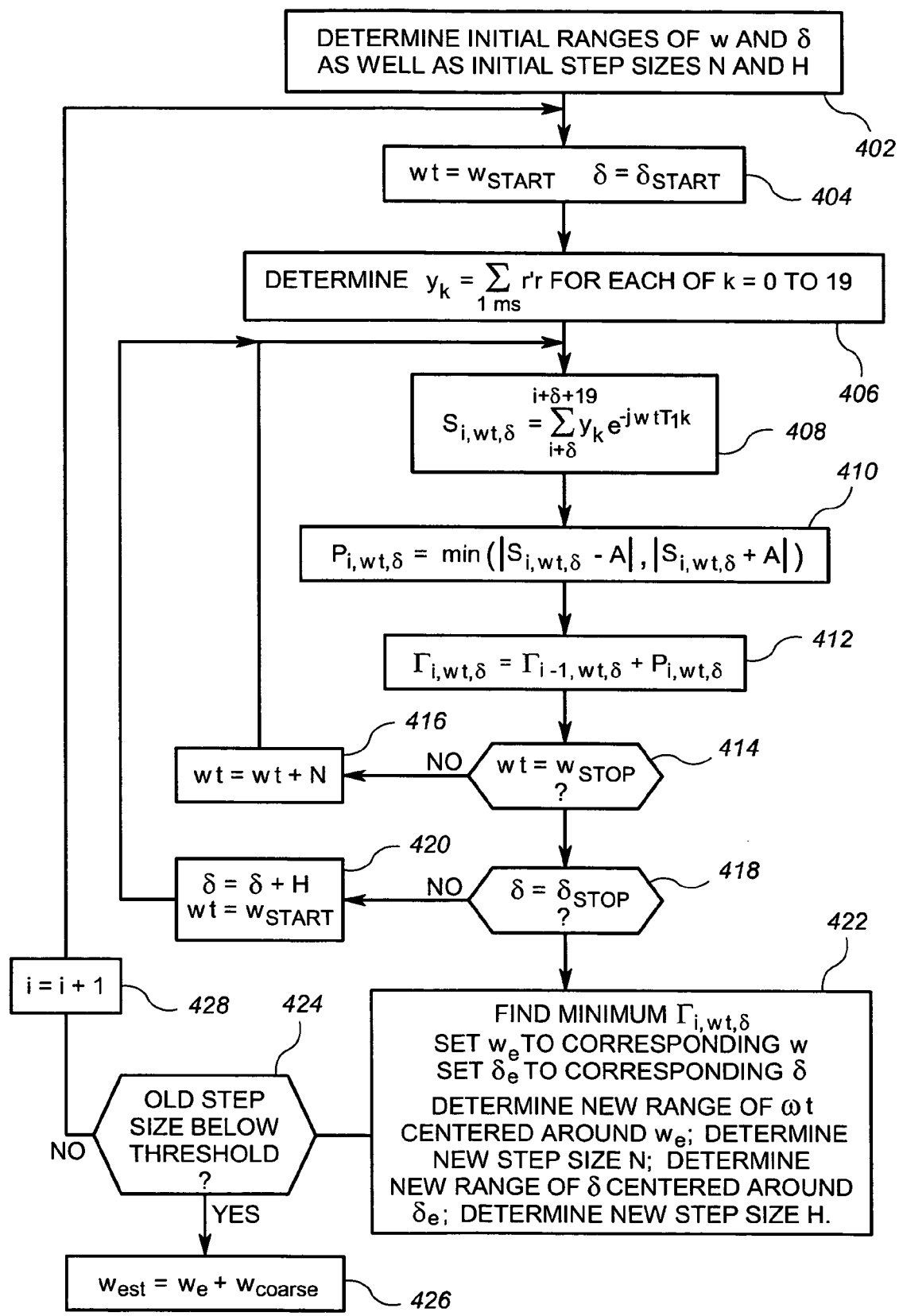
FIG. 4 shows in further detail an exemplary set of operations used to obtain an estimate of the Doppler frequency offset.

As discussed above, FIG. 4 shows an exemplary set of operations performed by the processing circuit 24 to generate an initial value of the Doppler frequency for the Kalman filter. It is known in the art that the Doppler frequency shift w between a satellite and a receiver will typically fall in the range of ±5 kHz. In this embodiment, it is assumed that coarse acquisition has been performed (step 302 of FIG. 3) and as a result, a coarse Doppler frequency shift value $w_{coarse}$ has been developed as a starting frequency for the operations of FIG. 4. However, if no coarse Doppler frequency shift is known, the operations of FIG. 4 may assume an error of ±5 kHz. When a coarse Doppler frequency shift is known, then the process of FIG. 4 is used to determine a Doppler frequency shift refinement $w_{ref}$ that is added (or subtracted) from the coarse Doppler frequency shift $w_{coarse}$ to arrive at the frequency $w_{est}$ that is used to initialize the Kalman filter.

The search for the Doppler frequency shift refinement $w_{ref}$ begins in step 402. In step 402, the processing circuit 24 divides a Doppler frequency refinement range into a predetermined set of G evenly-spaced test frequencies. G is preferably to be four or five, but may be larger if sufficient processing speed is available. Thus, if G=5 and the Doppler frequency range uncertainty is ±200 Hz, then in step 402, the Doppler frequency shift uncertainty range is divided into a set of evenly spaced frequencies $w_{test,g}$ {−200, −100, 0, +100, +200}. The value of $w_{start}$ is set to the first frequency −200 Hz, the value of $w_{stop}$ is set to the final frequency +200 Hz, and the step size N is set equal to 100 Hz.

In a similar manner, a start value for a correlation sample offset, $\delta_{start}$ is set equal to zero, a stop value for the correlation sample offset, $\delta_{stop}$ is set equal to 19, and a step H is set equal to a value for example, two. The correlation sample offset, δ, is ideally the number of 1 millisecond periods (time of one C/A code sequence) in which a data bit edge occurs. (See e.g., FIG. 7). Further detail regarding the correlation sample offset δ, as well as identification of a correlation sample, is provided further below in connection with step 406.

In step 404, a current test frequency wt is set to $w_{start}$. Thus, in the above example, the test frequency wt is −200 Hz. Similarly, a current correlation sample offset (1 ms offset) δ is set equal to $\delta_{start}$.

Then, in step 406, the processing circuit 24 obtains a correlation sample for each consecutive one millisecond period for twenty milliseconds. A correlation sample is a sum of multiplications of an estimate of the received signal r' with the actual received signal r for an entire length of a C/A code sequence, i.e. 1 millisecond.

In particular, the estimate r' of the received signal r includes the internal C/A code replica as affected by estimates of the Doppler frequency w' and phase φ'. The estimate r' of the received signal is expressed as:

$$r_q' = c_q' e^{j2\pi w' t} \quad (8)$$

where c' is the internal code replica, q is the sample index of the incoming signal, and w' represents an estimate of the Doppler frequency offset. The value of w' is set equal to the Doppler frequency $w_{coarse}$ obtained from the coarse acquisition in step 302.

A correlation sample $y_k$ is a sum of these correlation taken over an entire C/A code sequence length, and is represented as:

$$y_k = \Sigma r_q' r_q, \text{ for q=1 millisecond worth of samples (one C/A code sequence)} \quad (9)$$

where k is an index to the C/A code sequence repetition. Thus, the first C/A code sequence worth of samples would be represented as the correlation sample $y_0$, the second C/A code sequence worth of samples would be represented as the correlation sample $y_1$, and so forth. The 1 millisecond time frame is referred to herein as the correlation sample period. The correlation samples $y_k$ may suitably be generated in an ongoing manner while the other operations of FIG. 4 are executing.

In step 408, the processing circuit 24 generates a sum of twenty correlation samples $S_{i,wt,\delta}$ using an adjustment based on a hypothesis that the frequency refinement is equal to wt and the bit edge of the data signal is located at δ milliseconds after a start iteration period of i. The value of each correlation sample sum $S_{g,h}$ is given by:

$$S_{i,wt,\delta} = \Sigma y_k e^{-jwtTlk}, \text{ where } k=i+\delta \text{ to } i+\delta+19 \text{ correlation samples,} \quad (10)$$

wherein i is a reference for the summation iteration, and TI is the integration time for a correlation same (1 ms). As will be discussed below, in other sub-iterations, the correlation sample offset $\delta$ is changed to generate other correlation sample sums $S_{i,wt,\delta}$, and using other test frequency refinements wt.

After the processing circuit 24 has completed the summation of correlation samples for the test frequency wt and the offset $\delta$, the processing circuit executes step 410. In step 410, the processing circuit 24 determines, for each value $S_{i,wt,\delta}$, an error signal $P_{i,wt,\delta}$ which is given by the minimum of two error signals each assumes a data value $d_i$ of either +1 or −1. Thus, the error signal $P_{i,wt,\delta}$, is min($|S_{i,wt,\delta}−A|$, $|S_{i,wt,\delta}+A|$), where A is an estimate of the magnitude of the received signal, which is obtained from the estimate of the signal power. The estimate of the signal power may suitably be obtained from an acquisition process such as the coarse acquisition process of step 302. In an alternative, the magnitude estimate A may be set equal to the real portion of the sum $P_{i,wt,\delta}$. In any event, the minimum of the error signals constitutes the path weight of the Viterbi algorithm for the current values of wt and $\delta$.

In step 412, the processing circuit 24 adds the minimum error signal $P_{i,wt,\delta}$, which is also the path weight, to a cumulative path weight for the values of wt and $\delta$, which is given by the equation:

$$\Gamma_{i,wt,\delta} = \Gamma_{i-1,wt,\delta} + P_{i,wt,\delta} \quad (11)$$

After step 412, the iteration i for the combination of current values of wt and $\delta$ has been completed. The cumulative path weight $\Gamma_{i,wt,\delta}$ provides a measure of how accurate the combination of wt and $\delta$ are considered to be. The value of $\Gamma_{i,wt,\delta}$ has an inverse relationship to accuracy likelihood. Initially, all values of $\Gamma_{i,wt,\delta}$ are initialized to zero.

In step 414, the processing circuit 24 determines whether wt=$w_{stop}$. If not, then the wt value is incremented by the step value N in step 416. After step 416, the processing circuit 24 returns to step 408 to perform a new summation of correlation samples using the different test frequency with a different offset. However, if it is determined in step 414 that wt=$w_{stop}$, then the processing circuit 24 executes step 418 instead of step 416. If such is the case, then the path weights $\Gamma$ for all of the frequencies have been obtained for the $\delta$ value in the iteration i.

In step 418, the processing circuit 24 determines whether $\delta=\delta_{stop}$. If not, then the $\delta$ value is incremented by the step value H in step 420. Also in step 420, the test frequency is reset to $w_{start}$. The processing circuit 24 may then return to step 408 to generation new summations of correlation samples using the new offset value $\delta$. It will be appreciated that the processing circuit 24 (or another device) is performing step 406 in an ongoing manner, in order to ensure that a full twenty correlation samples are available after the delay period of $\delta$ milliseconds.

If, however, in step 418, the processing circuit 24 determines that $\delta=\delta_{stop}$, then the iteration i is complete for all test values of wt and $\delta$. In such case, the processing circuit proceeds to step 422. In step 422, the processing circuit 24 finds the minimum cumulative path weight $\Gamma_{i,w,\delta}$ and uses the corresponding values w and $\delta$ as estimates, $w_e$ and $\delta_e$ for the next iteration i+1. In particular, the processing circuit 24 determines a new range of frequency refinement values ($w_{start}$ to $w_{stop}$) centered around $w_e$ and a new range of correlation offset values ($\delta_{start}$ to $\delta_{stop}$) centered around $\delta_e$. In general, the frequency range may suitably be ½ the frequency range of the previous iteration, as may the correlation offset value range. Once the frequency range is determine, the same number of steps are used, with the interval between adjacent frequencies being reduced correspondingly. For example, if the first iteration uses a range $w_{start}=−200$ Hz to $w_{stop}=+200$ Hz, with a step value of N=100 Hz, and if the frequency range is halved, then the second iteration would use a range of $w_{start}=w_e−100$ Hz to $w_{stop}=w_e+100$ Hz, and have a step value of N=50 Hz, In any event, after step 422, the processing circuit 24 proceeds to step 424. In step 424, the processing circuit 24 determines whether enough iterations have been completed to provide a sufficient refinement of the Doppler frequency estimate to initialize the Kalman filter. To this end, the processing circuit 24 determines whether the old step value N is below a threshold. In the example described herein, a step value of approximately 1 to 2 Hz corresponds to sufficient refinement, which should translate to approximately a 1 to 2 Hz resolution. This resolution wres, is also used to initialize the covariance matrix of the Kalman filter, discussed further below in connection with FIG. 6.

If the processing circuit 24 determines in step 424 that N is below the threshold, then the final refined Doppler frequency $w_{est}$ is generated and stored in 426. In particular, the processing circuit 24 in step 426 generates the Doppler frequency estimate $w_{est}$ by adding the current refinement estimate $w_e$ to $w_{coarse}$. The value $w_{est}$ is stored in step 426 so that it may later be used to initialize the Kalman filter in FIGS. 5 and 6. The operations of FIG. 4 are complete in step 426.

However, if the answer in step 424 is in the negative, then the processing circuit 24 increments the iteration counter i in step 428 and returns to step 404. In step 404, the processing circuit 24 will initialize wt and $\delta$ to the new values of $W_{start}$ and $\delta_{start}$, respectively.

It will be appreciated that the Extended Kalman Filter discussed below in connection with FIGS. 5 and 6 also requires an initial time invariant phase value $\phi_{est}$ of the Doppler frequency shift and a rate of change $\alpha_{est}$ of the Doppler frequency shift.

In order to generate $\phi_{est}$, operations similar to those of FIG. 4 may be performed. In particular, the operations of FIG. 4 may be used to generate the estimate of the time invariant phase component of the Doppler frequency offset by varying test phase value $\phi$t instead of frequency offsets wt. The summation of correlation values of step 408 would use the following modified equation.

$$S_{i,\phi t,\delta} = \Sigma y_k e^{-j(\phi t + w'Tlk)}, \text{ where } k=i+\delta \text{ to } i+\delta+20 \text{ correlation samples,} \quad (12)$$

wherein w' is the estimate of the Doppler frequency offset $w_{est}$ obtained in step 426 as described above. In addition, the correlation samples $y_k$ are generated using a slightly different estimate r' of the incoming signal. The estimate r' used for correlations to determine the initial phase value $\phi$ is $$r_q' = c_q' e^{j2\pi(w')t} \text{ where w' is the value } w_{est} \text{ determined in step 426 of FIG. 4.} \quad (13)$$

As discussed above, the values of $\phi$t are varied iteratively as wt was in FIG. 4. The resulting phase estimate $\phi_{est}$ may later by used to initialize the Kalman Filter.

It will be appreciated that other algorithms may be used to estimate $\alpha$ to initialize the Kalman filter of FIG. 5. In such cases the initial value of $\alpha$ is similarly estimated after the refined Doppler frequency offset estimate $w_{est}$ is obtained. However, in situations involving low dynamics, which is assumed herein, $\alpha$ is small and changes the Doppler shift by a very small value during the estimation period; such small change can be ignored.

As discussed above, FIG. 5 shows an exemplary set of operations performed by the processing circuit 24 to converge on a solution for the Doppler frequency and for the location of the data bit edge within the repeating pattern of twenty correlation samples. To this end, the operations in FIG. 5 run, in parallel, up to twenty different possible solutions to the Doppler frequency, phase and bit edge location. After some iterations, it becomes more clear which bit edge solution is correct, and the Doppler frequency shift and phase will converge. The different possible solutions all use a different correlation sample period offset $\delta$. The algorithm initializes with all twenty possible offsets $\delta=0$ to 19. However, when the algorithm converges, a single best solution for the offset value $\delta$ is selected.

As the algorithm progresses, data values $d_i$ for each data bit period i are stored for each of the twenty parallel solutions. When the algorithm converges, the data bits $d_{i,\delta}$ of the solution corresponding to the correct $\delta$ value may be used to obtain at least a part of the navigational data signal.

In the embodiment described herein, the operations of FIG. 5 determine refinements of the Doppler frequency w over the estimate $w_{est}$ generated in FIG. 4. Thus, the Kalman filter may suitably be initialized with zero for the Doppler frequency refinement w, time-invariant phase refinement $\phi$, and the refinement of the rate of change of the Doppler frequency $\alpha$. Then, upon convergence of the algorithm, the final values of $w_{final}$, $\phi_{final}$, and $\alpha_{final}$ may be added to the estimates $w_{est}$, $\phi_{est}$, and $\alpha_{est}$ to give a refined Doppler frequency offset, phase offset, and rate of change of the Doppler frequency for use in subsequent tracking algorithms.

Referring to FIG. 5 in detail, in step 502, the Viterbi algorithm and Kalman filter are initialized. The processing circuit 24 sets twenty different cumulative path weights, each associated with one of the twenty possible values of $\delta$, are initialized to zero, $\Gamma_{0,\delta}=0$. The weight $\Gamma_{i,\delta}$ represents a measure of the cumulative error for a particular value of $\delta$ for a number i of iterations. The processing circuit 24 also initializes the state and covariance matrices of the Kalman filter, as will be discussed further below in connection with FIG. 6. The state matrix $X_{i,\delta}=\{\phi_{i,\delta}, w_{i,\delta}, \alpha_{i,\delta}\}$ is set to $\{0, 0, 0\}$ for each value of $\delta$. These initial values will be used for the start of the Viterbi algorithm.

The i value of the iteration corresponds to the current data bit period. In other words, i is indexed to each navigation signal data bit $d_i$. Thus, the twenty possible offsets $\delta=0$ to 19 represent the possible position of the bit edge of $d_i$. Once the most likely $\delta$ value is found, then the bit edge of $d_i$ has been detected and then further tracking may use all twenty correlation samples after the bit edge for subsequent correlations.

Thereafter, in step 504, the iterations of $\delta$ for the current iteration (initially i=0) are initialized by setting $\delta=0$.

Then, in step 506, the processing circuit 24 generates correlation samples in an ongoing manner for each consecutive one millisecond period. As discussed above in step 406, the correlation sample is a sum of multiplications of an estimate of the received signal r' with the actual received signal r for an entire length of a C/A code sequence, i.e. 1 millisecond. However, unlike step 406, the correlations performed in step 506 employ an improved estimate of the received signal r''. This improved estimate takes advantage of the estimated refined Doppler frequency offset $w_{est}$ and phase $\phi_{est}$ generated in the manner described further above.

In particular, the estimate of the received signal includes the internal C/A code replica as affected by estimates of the Doppler frequency $w_{est}$ and phase $\phi_{est}$. The estimate r'' of the received signal is expressed as:

$$r_q''=c_q'e^{j2\pi(w'')t+j\phi''} \quad (14)$$

where c' is the internal code replica, q is the sample index of the incoming signal, and $w''=w_{est}$ and $\phi''=\phi_{est}$. The correlation sample $y_k$ is a sum of these correlation takens over an entire C/A code sequence length, and is represented as:

$$y_k=\Sigma r_q''r_q, \text{ for q=1 millisecond worth of samples (one C/A code sequence)} \quad (15)$$

where k is an index to the C/A code sequence repetition. As in FIG. 4, the 1 millisecond time frame is referred to as the correlation sample period. In step 506, the correlation samples $y_k$ may suitably be generated in an ongoing manner while the other operations of FIG. 5 are executing.

In step 508, the processing circuit 24 generates iteration values for the values w, $\phi$, and $\alpha$. These values consist of the existing Kalman filter values $w_{i,\delta}$, $\phi_{i,\delta}$, and $\alpha_{i,\delta}$ corresponding to the current correlation sample offset $\delta$, which are time aligned to the beginning of the current iteration. In the embodiment described herein, the Kalman filter values $w_{i,\delta}$, $\phi_{i,\delta}$, and $\alpha_{i,\delta}$ represent the those values as they exist half-way through the twenty correlation samples, and must be extrapolated back to the beginning. Thus, in step 508, the processing circuit sets the following values:

$$\alpha_i=\alpha_{i-1,\delta} \quad (16)$$

$$w_i=w_{i-1,\delta}+\tfrac{1}{2}\alpha_i(T_{db}) \quad (17)$$

$$\phi_i=\phi_{i-1,\delta}+\tfrac{1}{2}w_i(T_{db})+(\tfrac{1}{6})\alpha_i(T_{db})^2, \quad (18)$$

where $T_{db}$ is the time period of one data bit, i.e. 20 milliseconds. The values $\alpha_i$, $w_i$ and $\phi_i$ are then used for the remaining calculations of the iteration of the Viterbi algorithm.

In step 510, the processing circuit 24 computes the model phase corrections for each of the 20 millisecond periods k=0 to 19 corresponding the $y_k$ values. The phase corrections utilize the values derived from the Kalman filter. The phase for each k is given by:

$$\phi(k)=\phi_i+kw_i(T_{cs})+\tfrac{1}{2}\alpha_i(T_{cs})^2, \quad (19)$$

where $T_{cs}$ is the time period of one correlation sample, i.e. 1 millisecond.

Thereafter, in step 512, the processing circuit 24 determines the sum of the twenty consecutive correlation samples starting at the time of the reference i plus $\delta$. To this end, the processing circuit 24 calculates the following:

$$S_{i,\delta}=\Sigma y_k e^{-j\phi(k)}, \text{ for } n=i+\delta \text{ to } i+\delta+20, \quad (20)$$

wherein $$y_k=\Sigma r_q''r_q, \text{ as in equations (14) and (15) of step 506.} \quad (21)$$

In step 514, the processing circuit 24 for $S_{i,\delta}$ determines two error signals, $P_{i,\delta,d}$ for d=+1 and −1, which is represented by $|S_{i,\Delta}-Ad_i|$, where A is an amplitude value of the received signal, and $d_i$ is each of the two possible navigational data values −1 or +1. The processing circuit 24 further determines the value of $d_i$(−1 or +1) where $P_{i,\delta,d}$ is minimized. That value is $d_{i,\delta}$. The corresponding minimum error value is represented as the path weight of the Viterbi algorithm, $P_{i,\delta}$.

Once $P_{i,\delta}$ and $d_{i,\delta}$ are determined in step 514, then the cumulative path weight for the value of $\delta$ is updated in step 515. To this end, the processing circuit 24 generates:

$$\Gamma_{i+1,\delta}=\Gamma_{i,\delta}+P_{i,\delta} \quad (22)$$

In step 516, the processing circuit 24 executes the Kalman filter to generate new values of $w_{i+1,\delta}$, $\phi_{i+1,\delta}$, and $\alpha_{i+1,\delta}$ for use in the next iteration for δ. To this end, the Kalman filtering operation uses the current values and the error signal $P_{i,\delta}$ to determine the new values.

EKF Estimation

The phase estimation is formulated as follows. The summation over twenty 1-milliscond correlated signals is $$S_{i,\Delta} = A\, d_{i,\delta} e^{j\,\phi e(i,\delta)} + n_{i,\delta} \quad (23)$$

Where $\phi_e(i,\delta)$ is the average phase error over the interval i, for a possible bit edge location δ, and n is a noise term. The phase estimation over the interval i can be expressed with a log likelihood function Λ as $$\Lambda(Y|\phi_e(i,\Delta)) = -C\Sigma|y_{(k,\Delta)} - Ad_{(k,\Delta)} e^{j\phi e(k,\Delta)}|^2 \quad (24)$$

Where C is some constant. This can be expanded, and the irrelevant constants are discarded to give a log likelihood as $$\Lambda(Y|\phi_e(i,\Delta)) = \text{Real}\{d_{i\Delta}\Sigma y_{(k,\Delta)} e^{-j\phi e(k,\Delta)}\} \quad (25)$$

The phase estimation can be found by computing the zero of the derivative of this log likelihood function, and replacing $d_{i\delta}$ and $\phi_e(k,\delta)$ by the estimates $d_{i,\delta}$ and $\phi_e(k,\delta)$, respectively. Such operation will give an error signal proportional to the current error in the phase estimation. Thus the output of this operation is used to generate the residual of the Extended Kalman filter. The residual of the extended Kalman filter, $res_{i\delta}$, along with a gain factor, which is calculated by a known method, are used to update the current estimate of the phase, Doppler frequency and the rate of change of the Doppler frequency. Then, the Extended Kalman filter output is propagated to the next step (i+1); the propagated values are used to obtain the values φ(k) of equation 19. Further detail regarding the operation of the Kalman filter is provided below in connection with FIG. 6.

After step 516, the processing circuit 24 proceeds to step 518. In step 518, the processing circuit 24 determines whether δ=19. If so, then analysis of the current iteration i is completed. In such a case (δ=19), then the processing circuit 24 increments an iteration counter N in step 520. After step 520, the processing circuit 24 executes step 522.

In step 522, the processing circuit 24 determines whether any of the possible values of δ should be eliminated from further iterations because they are not converging to a solution as rapidly as other values. It is noted that step 522 need not be executed for every iteration of i, but may instead be performed only every $r^{th}$ iteration.

In any event, in step 522, the processing circuit 24 compares the minimum cumulative summation or path weight, $\min(\Gamma_{i,\delta})$, corresponding to an offset value $\delta_{min}$, to a number of the highest cumulative summations or path weights max $(\Gamma_{i,\delta})$ at other bit edge offset values. If the difference between the minimum $\Gamma_{i,\delta}$ and another larger $\Gamma_{i,\delta}$ is greater than a threshold, then it is determined that the offset value that generates the larger $\Gamma_{i,\delta}$ is most likely incorrect location for the bit edge. If an offset value δ is determined to be most likely incorrect, then its associated Extended Kalman filter is inactivated and the cumulative summation $\Gamma_{i,\delta}$ is deleted, and no further processing is done for that bit edge location. To ensure that no further operations occur, the bit edge location is flagged.

After step 522, the processing circuit 24 proceeds to step 524. In step 524, the processing circuit 24 determines whether there is only one value δ that has not been flagged. If so, then the process is complete. In such a case, the processing circuit 24 in step 526 uses the current state matrix $\{\alpha_{i,\delta}, w_{i,\delta}, \phi_{i,\delta}\}$ for further tracking of the data signal, and obtains the navigation data bit estimates $d_{i,\delta}$ for i=0 to i=N−1 to decode the navigation data signal. It will be noted that the current state matrix values now become $\alpha_{final}, w_{final}, \phi_{final}$. Because in the present embodiment, the Kalman filter was initialized with Doppler frequency offset and phase refinement values of 0 (as opposed to $w_{est}$ and $\phi_{est}$), the subsequent tracking actually uses the values $w=w_{final}+w_{est}, \phi=\phi_{final}+\phi_{est}$ and $\alpha=\alpha_{final}$.

If, however, it is determined in step 524 that there exist more than one unflagged value of δ, then the processing circuit 24 performs a new iteration i beginning with step 528. In step 528, the processing circuit 24 resets δ to the first unflagged value. Thus, if δ=0 is not yet flagged, then the processing circuit 24 sets δ=0.

Referring again to step 518, if the processing circuit 24 determines that the current value of δ is not yet 19, then the processing circuit 24 in step 530 increments δ to the next unflagged value of δ that is greater than the current value of δ. (If no unflagged δ value exists that is greater than the current δ, then the processing circuit proceeds to step 520, although not shown in the flow diagram for clarity purposes).

After step 530, the processing circuit 24 returns to step 508 to perform the next iteration using the next data bit edge offset value δ.

The above described algorithm thus simultaneously filters various summations of correlation samples that are each offset by a different number of correlation sample periods. In time, the algorithm converges because the summation of the correlation samples with the offset value δ that corresponds to the bit edge will tend toward the least error over time, even in the presence of a weak signal.

When the algorithm is complete, (see step 526), the current values are used to determine the delay between the satellite transmitted code and the internally generated replica. The δ value is also used to identify the bit edges of the data signal $d_i$ so that the navigational data of the satellite may be obtained.

However, it will be appreciated that further operations may be necessary in the presence of weak signals to ascertain the data signal.

For example, in weak signals, the Bit Error Rate (BER) in the estimated data values $d_i$ could be large and thus it could prevent the decoding of the navigational data. The GPS navigation message has some data that repeat every specified time. Words 3-10 of sub-frames 1-3, which contain the ephemeris, repeat every 30 seconds, while words 3-10 of sub-frames 4-5, which contain the almanac, repeat every 12.5 minutes. This message structure is utilized to decode the navigational data of very weak signals.

In particular, the data detection limit is found from the theoretical BER, which is BER=½erfc(sqrt(SNR)), where: erfc is the complementary error function, and SNR is the signal to noise ratio of the received signal. The SNR is related to the carrier to noise ratio $C/N_0$ of the received signal by the number 1-millisecond correlated samples that are added together: $SNR=C/N_0\, T_1$, where $T_1$ is equal to 20 millisecond (as described in connection with the Viterbi algorithm ("VA") and Extended Kalman filter operations of FIGS. 4, 5 and 6).

The BER for the data sequence that is estimated by the VA approaches the theoretical limit. But this limit is high at very low power signals. The repeated data described above is utilized to obtain acceptable BER at any $C/N_0$ by adding together the correlated signals that contain the same information, then estimating the data bit value of the addition result. For example, the data content of each 20 1-millisecond correlated signals that belong to sub-frames 1-3 repeat every 1500*20 milliseconds. Adding the correlated signals with the same content results in an increase in the SNR, and thus decrease in the BER. Adding enough instances of repeated data will enable obtaining acceptable BER at any $C/N_0$. Thus the navigation message can be decoded for any weak signal. This will enable obtaining the content of the navigation message, thus the receiver position can be calculated.

In any event, the above described embodiment provides an advantage of using a recursive procedure, which results in the ability to using ongoing signal data as it is received. In other words, the acquisition does not require large amounts of reprocessing the same data, which can be computationally intensive.

Figure 6:
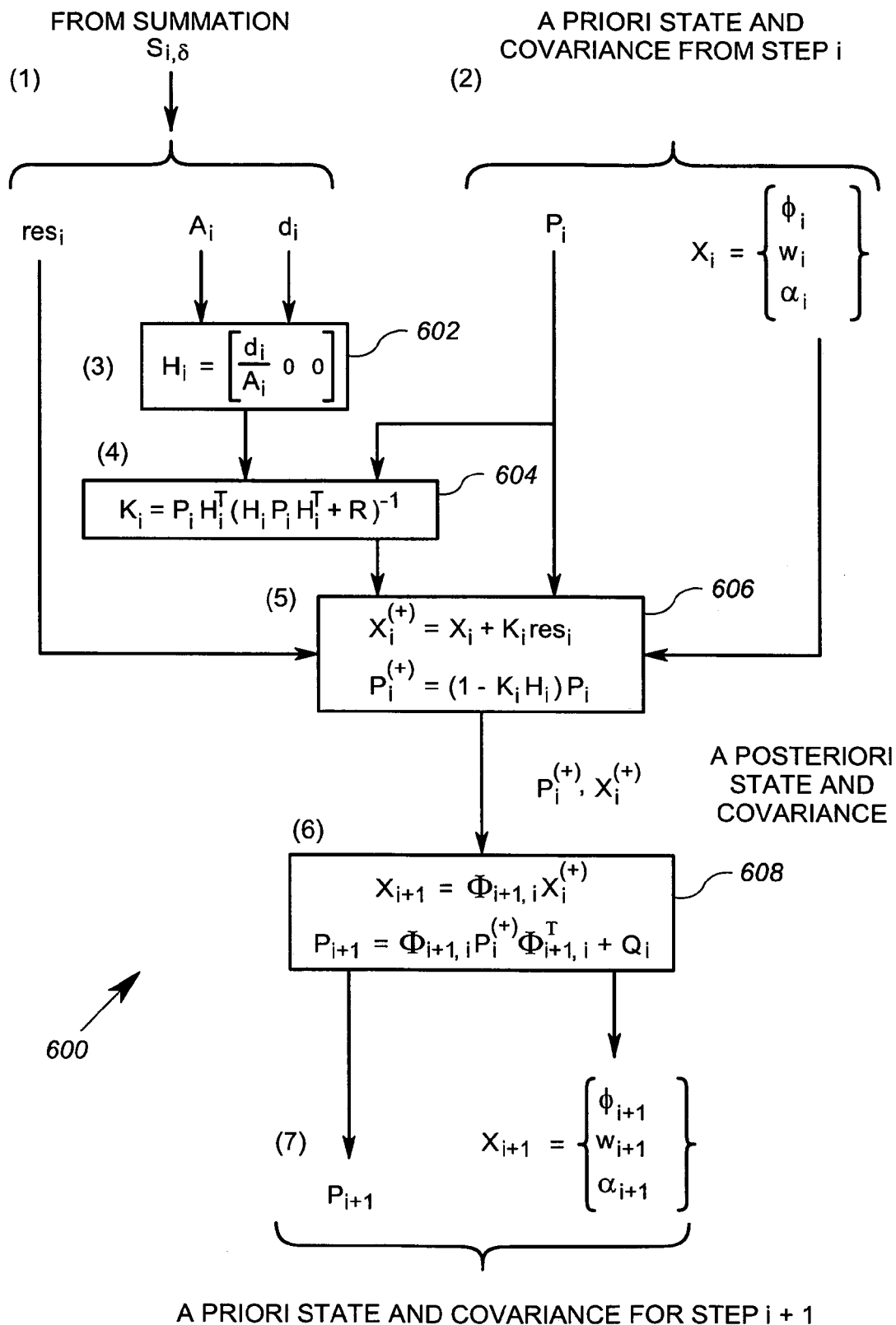
FIG. 6 shows in further detail an exemplary set of operations that may be used to carry out the Kalman filter update operation of FIG. 5.

FIG. 6 shows an exemplary set of operations 600 that execute a Kalman filter update which may suitably be executed as step 516 of FIG. 5. Each of the values of FIG. 6 should be considered specific to the Kalman filter associated with the particular delay value $\delta$, even though the $\delta$ subscripts have been removed for clarity purposes.

The values used in the Kalman filter update of FIG. 6 are $res_i$, A, $d_i$, the current state matrix $X_i = \{\phi_i, w_i, \alpha_i\}$, and a covariance matrix $P_i$. The covariance matrix $P_i$ is a 3×3 matrix that is updated each time the Kalman filter is updated.

The value $res_i$ is called the residual, which may suitably be obtained as described above in connection with step 516 of FIG. 5. In other embodiments, it may be obtained from the imaginary part of the value $P_{i,\delta}$ (calculated in step 508 of FIG. 5). The value A is the amplitude, which is also used in FIG. 5 and preferably derived from the coarse acquisition procedure of step 302 of FIG. 3. The value $d_i$ is the $d_{i,\delta}$ value that results in the minimum current error $P_{i,\delta}$ discussed above in connection with step 514 of FIG. 5. The state matrix values are the most previous iteration of those values. As discussed above, the covariance matrix values are resolution values that are updated by each operation of the Kalman filter as will be discussed below.

As discussed further above in connection with FIGS. 4 and 5, the Kalman filters for all values of $\delta$ must be initialized with initial values of the state matrix and the covariance matrix. For the initial i=0 state matrix values, $\phi_i=0$, $w_i=0$ and $\alpha_i=0$. The initial covariance matrix is given by:

$$P_0 = \begin{matrix} \varphi res^2 & 0 & 0 \\ 0 & wres^2 & 0 \\ 0 & 0 & \varepsilon^2 \end{matrix}$$

wherein wres is the final resolution of $w_{est}$ developed in FIG. 4, and $\phi res$ is the final resolution of the $\phi_{est}$, developed as discussed above. The resolution of $w_{est}$ may be determined based on the final step size in the algorithm of step 426 of FIG. 4. The resolution of $\phi_{est}$ may be determined in a similar way.

The first operation of the Kalman filter, step 602 of FIG. 6, is to generate a linearization matrix $H_i$ using the equation $$H_i = \{d_i/A, 0, 0\} \tag{26}$$

In step 604, the processing circuit 24 calculates a Kalman gain $K_i$ using the equation:

$$K_i = P_i H_i^T (H_i P_i H_i^T + R)^{-1} \tag{27}$$

where R is the noise variance of the summations of $S_{i,\delta}$, which is equal to 1 if the noise in $S_{i,\delta}$ has been normalized. Then, in step 606, the processing circuit uses the Kalman gain and other inputs to update the covariance and state matrix of the current iteration i.

$$X_i^{(+)} = X_i + K_i res_i \tag{28}$$

$$P_i^{(+)} = (1 - K_i H_i) P_i \tag{29}$$

While the matrices $X_i^{(+)}$ and $P_i^{(+)}$ are improved (thus providing an improved estimate of $\phi_i$, $w_i$, and $\alpha_i$ for the current filter associated with $\delta$), the matrices need to be propagated to the passage of time associated with the next iteration. Thus, in step 608, the processing circuit 24 propagates $X_i^{(+)}$ and $P_i^{(+)}$ to the next iteration i+1:

$$X_{i+1} = \Phi_{i+1,i} X_i^{(+)} \tag{30}$$

$$P_{i+1} = \Phi_{i+1,i} P_i^{(+)} \Phi_{i+1,i}^T + Q_i \tag{31}$$

where $\Phi$ is a matrix $$\Phi_{i+1,i} = \begin{matrix} 1 & T_{db} & 1/2 T_{db}^2 \\ 0 & 1 & T_{db} \\ 0 & 0 & 1 \end{matrix}$$

and where, as discussed further above, $T_{db}$ is the duration of the a data bit, and thus an iteration, which is approximately 20 milliseconds. $Q_i$ is 3×3 matrix of the process noise, derived from the clock noise.

The result of the operations is that a new X matrix for the value $\delta$ has been developed for the next iteration. Thus the values of $w_{i+1,\delta}$, $\phi_{i+1,\delta}$ and $\alpha_{i+1,\delta}$ are ready for the next iteration for the delay value of $\delta$. The covariance matrix $P_{i+1,\delta}$ is also developed for the next operation of the Kalman filter.

It will be appreciated that the above described embodiment is merely exemplary and that those of ordinary skill in the art may readily devise their own implementations that incorporate the principles of the present invention and fall within the spirit and scope thereof.

We claim:

1. A method for use in the acquisition of a location system signal, the location system signal including a first data signal and a second data signal superimposed on the first data signal, the method comprising:

a) generating an initial Doppler frequency offset value, the Doppler frequency offset representing a variance from a nominal frequency for the location system signal and a frequency of a received location system signal;

b) using the initial Doppler frequency offset value and at least one other Doppler frequency offset value to generate a plurality of error signals, each error signal representing a difference between a sum of consecutive correlation values and a corresponding estimated ideal value, each error signal corresponding to a different time offset and an associated time period in which the consecutive correlation values pertain, the second data signal having a bit edge during the time period of each of at least some of the sums of consecutive correlation values, and wherein a bit transition at the bit edge causes an increase in the error signal when the bit edge occurs during the associated time period;

c) identifying a time offset value wherein a measure of the error signal is minimal, the identified time offset value identifying the bit edge;

d) employing the identified time offset value to obtain a first determined Doppler frequency value; and e) using a Kalman filter to generate a refined Doppler frequency offset value based at least in part on the first determined Doppler frequency value.

2. The method of claim 1, wherein each correlation value represents a correlation between a received signal and a code sequence, the code sequence comprising a replica of the first data signal.

3. The method of claim 2, wherein step a) further comprises adjusting the code sequence using the initial Doppler frequency offset.

4. The method of claim 2, wherein the code sequence is a C/A code sequence of a global positioning satellite (GPS) system.

5. The method of claim 4, wherein the second data signal includes a navigational data signal generated by a satellite in the GPS system.

6. The method of claim 3, wherein each time offset is approximately an integer multiple of the first data signal period.

7. The method of claim 1, wherein the time period associated with each sum of consecutive correlation values is approximately equal to the bit period of the second data signal.

8. The method of claim 1, wherein step a) further comprises analyzing a plurality of potential Doppler frequency offsets and selecting the initial Doppler frequency offset from the plurality of potential Doppler frequency offsets.

9. The method of claim 8, wherein step a) further comprises performing for each potential Doppler frequency offset a correlation between a received signal and a code sequence, the code sequence comprising a replica of the first data signal.

10. The method of claim 9, wherein step a) further comprises, for each potential Doppler frequency offset, adjusting the code sequence using the potential Doppler frequency offset.

* * * * *

UNITED STATES PATENT AND TRADEMARK OFFICE
CERTIFICATE OF CORRECTION

| | | |
|---|---|---|
| PATENT NO. | : 7,545,894 B2 | Page 1 of 1 |
| APPLICATION NO. | : 11/087065 | |
| DATED | : June 9, 2009 | |
| INVENTOR(S) | : Ziedan et al. | |

It is certified that error appears in the above-identified patent and that said Letters Patent is hereby corrected as shown below:

In the Specification:
After Col. 1, line 7 and immediately before the section titled "FIELD OF THE INVENTION" add the following statement:

"STATEMENT OF GOVERNMENT FUNDING

This invention was made in part with support from the National Aeronautics and Space Administration grant No. NAG5-12065. The Government may have certain rights in the invention."

Signed and Sealed this

Thirteenth Day of October, 2009

David J. Kappos
*Director of the United States Patent and Trademark Office*